United States Patent
Budnik et al.

(10) Patent No.: US 11,630,758 B2
(45) Date of Patent: Apr. 18, 2023

(54) ARTIFICIAL INTELLIGENCE ENABLED OUTPUT SPACE EXPLORATION FOR GUIDED TEST CASE GENERATION

(71) Applicant: Siemens Aktiengesellschaft, Munich (DE)

(72) Inventors: Christof Budnik, Hamilton, NJ (US); Georgi Markov, Plainsboro, NJ (US); Marco Gario, Plainsboro, NJ (US); Zhu Wang, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/966,669

(22) PCT Filed: Feb. 6, 2019

(86) PCT No.: PCT/US2019/016837
§ 371 (c)(1),
(2) Date: Jul. 31, 2020

(87) PCT Pub. No.: WO2019/157046
PCT Pub. Date: Aug. 15, 2019

(65) Prior Publication Data
US 2021/0034500 A1 Feb. 4, 2021

Related U.S. Application Data

(60) Provisional application No. 62/626,890, filed on Feb. 6, 2018.

(51) Int. Cl.
*G06F 11/36* (2006.01)
*G06N 3/08* (2023.01)
(Continued)

(52) U.S. Cl.
CPC ...... *G06F 11/3608* (2013.01); *G06F 11/0772* (2013.01); *G06F 11/3684* (2013.01);
(Continued)

(58) Field of Classification Search
CPC ...... G06N 3/08; G06N 20/00; G06F 11/3688; G06F 11/3608; G06F 11/0772; G06F 11/3684; G06F 11/3692; G06K 9/6256
See application file for complete search history.

(56) References Cited

U.S. PATENT DOCUMENTS

| | | | |
|---|---|---|---|
| 6,415,396 B1 * | 7/2002 | Singh | G06F 11/3688 714/25 |
| 2013/0074040 A1 * | 3/2013 | Peranandam | G06F 11/3684 717/124 |

(Continued)

OTHER PUBLICATIONS

Hussam Hourani et al.; The Impact of Artificial Intelligence on Software Testing; 2019 IEEE; p. 565-570; retrieved on Nov. 9, 2022 (Year: 2019).*

(Continued)

*Primary Examiner* — S. Sough
*Assistant Examiner* — Cuong V Luu (57) ABSTRACT

A method for testing software applications in a system under test (SUT) includes building a reference model of the SUT that defines a computer-based neural network. The method includes training the reference model using input data and corresponding output data generated by the SUT, selecting an output value within a domain of possible output values of the SUT representing an output that is not represented in the output data used to train the reference model, applying the selected output value to the reference model, and tracing the selected output through the reference model to identify test input values that when input to the reference model, produce the selected output value. The method can further include (Continued)

using the identified test input values to test the system under test.

12 Claims, 5 Drawing Sheets

(51) Int. Cl.
*G06F 11/07* (2006.01)
*G06K 9/62* (2022.01)

(52) U.S. Cl.
CPC ...... *G06F 11/3688* (2013.01); *G06F 11/3692* (2013.01); *G06K 9/6256* (2013.01); *G06N 3/08* (2013.01)

(56) References Cited

U.S. PATENT DOCUMENTS

| | | | |
|---|---|---|---|
| 2016/0026561 A1 | 1/2016 | Schur et al. | |
| 2017/0236060 A1* | 8/2017 | Ignatyev | G06N 20/00 706/46 |
| 2019/0087311 A1* | 3/2019 | Donaldson | G06N 3/08 |
| 2019/0213115 A1* | 7/2019 | Takawale | G06F 11/3692 |

OTHER PUBLICATIONS

Zubair Khaliq et al; Artificial Intelligence in Software Testing Impact Problems Challenges and Prospect; 2022 Elsevier; 13 pages; retrieved on Nov. 9, 2022 (Year: 2022).*
International Search Report dated Jul. 30, 2019; International Application No. PCT/US2019/016837; 21 pages.

* cited by examiner

ARTIFICIAL INTELLIGENCE ENABLED OUTPUT SPACE EXPLORATION FOR GUIDED TEST CASE GENERATION

CROSS-REFERENCE TO RELATED APPLICATIONS

This application is a national phase filing under 35 U.S.C. § 371 of International Patent Application No. PCT/US2019/016837, filed Feb. 6, 2019, which claims the benefit of priority to U.S. Provisional Patent Application Ser. No. 62/626,890, filed Feb. 6, 2018 entitled, "Guided Test Case Generation through AI Enabled Output Space Exploration" and U.S. Provisional Patent Application Ser. No. 62/628,557, filed Feb. 9, 2018, entitled, "Output Space Exploration for Black-Box Testing", which are incorporated by reference herein.

TECHNICAL FIELD

This application relates to the testing of systems. More particularly, the application relates to testing of software in an industrial system.

BACKGROUND

Verification of software is crucial for the delivery of safe and high-quality products. Within industry, testing represents the main verification approach used in software intensive systems. As the complexity of these systems increases, the number of test cases that need to be examined increases proportionately. Therefore, it is important to identify test cases that thoroughly test each feature of the software, that is, test cases which are likely to find defects of high criticality to the systems quality.

The ability for a given test case to detect a defect depends on the test inputs and the expected output. This defines the test case. Test inputs are provided to the system under test (SUT) to trigger some execution of the underlying software system. The expected output provides the state of the system as results of processing the inputs, thereby stimulating the system. In some cases, different test inputs may result in the same or similar system outputs. To be confident that all errors in the system are discovered, it is important to ensure that testing reaches each of the various output conditions defined by the system.

Challenges to fully test the system under test include finding the appropriate test inputs that result in particular output system responses. The selected inputs need to result in outputs that cover as much of the output space of system responses as possible. Moreover, once testing has begun, the selection of additional test cases should concentrate on outputs that have not been previously been tested. Other aspects for selection of outputs to test may include concentrating on values that approach constraint limits placed on the system. For example, output values to be targeted may include corner cases that are defined based on the system specifications. Further, the inputs should be able to be generated automatically without manual intervention requiring expert input.

Several approaches support the determination of test inputs of interest from a black-box perspective, that is where no internal information of the system is available. The predominant approach within industry to this point is to perform input selection through the assistance of a domain expert. The expert analyzes specification documents and uses his or her understanding of the system to identify corner-cases to create relevant inputs that test various combinations of inputs at extreme levels sometimes out of normal operating ranges. While this can be an effective approach, it is also a very expensive and time consuming approach. Moreover, the quality of the result mostly depends on the experience of the expert or tester.

Other black-box testing approaches to derive test inputs include equivalence partitioning and randomization. Equivalence partitioning divides the input data of a system into partitions of equivalent data assuming that equivalent data will result in similar system output responses. Randomized approaches on the other hand, including random simulation and fuzz testing, work by generating a massive number of possible inputs to be run through the system. However, these approaches concentrate on the inputs and do not consider the desired outputs when identifying inputs to try. Although it is possible to guide initially the generation of these inputs, it is very difficult to obtain good inputs for very specific output conditions due to dependencies between data and other factors. These approaches require a high level of domain knowledge. Approaches that focus on coverage criteria of the input space cannot provide any reliable guarantee regarding the degree of coverage in the output space. Embodiments described herein provide approaches that instead automate the process of generating inputs that lead to a chosen output.

SUMMARY

A method for testing software applications in a system under test (SUT) includes building a reference model of the SUT comprising a computer-based neural network, training the reference model using input data and corresponding output data generated by the SUT, selecting an output value within a domain of possible output values of the SUT representing an output that is not represented in the output data used to train the reference model, applying the selected output value to the reference model and tracing the selected output through the reference model to identify test input values that when input to the reference model, produce the selected output value and using the identified test input values to test the system under test. According to an embodiment, the method further comprises providing the determined input value to the reference model to generate the identified output value, providing the determined input value to the SUT to generate a test output value from the SUT and comparing the identified output value to the test output value.

According to other embodiments, the method further includes determining if the comparison indicates a difference between the identified output value and the test output value that exceeds a predetermined threshold. If so, the test output value is analyzed to determine if the test output value is a legitimate system output or if the difference indicates an error in the system. If it is determined that the test output value is a legitimate value, the neural network may be re-trained using a dataset containing the determined input and the identified output value and whereby if it is determined that the test output value is not a legitimate system output, then the system under test is analyzed to identify an error responsible for creating the illegitimate system output and the identified error is corrected.

To identify the output value from the output space of the software applications in an output generator receiving a current distribution and a target distribution; and outputting a new unexplored output value or plurality of output in a vector y'. In other embodiments, the output generator applies restrictions to a contiguous region of the input space and applies restrictions to the output space to only select the new output vector from an unexplored output space. The output generator may further select the new output vector y' by modifying an existing output from the training set by a context-dependent large value and based on a visual comparison of distribution plots of a current output space coverage and a target output space distribution.

A system for testing software applications in a SUT includes a computer processor in communication with the SUT, a memory in communication with the computer processor containing executable instructions that when executed by the processor cause the processor to create a data structure representative of a reference model that approximates the function of the SUT, identify an output value from the output space of the software applications that is an output value that has not been observed through prior testing, present the identified output value to the reference model and trace the output value through the reference model to determine at least one input value or vector of input values that results in the identified output value or values when input to the reference model. The reference model is embodied as an artificial neural network (ANN). In some embodiments, the executable instructions further include instructions that further cause the processor to provide the determined input value to the reference model to generate the identified output value, provide the determined input value to the SUT to generate a test output value from the SUT and compare the identified output value to the test output value. According to some embodiments, the executable instructions further comprise instructions that further cause the processor when the comparison indicates the difference between the identified output value and the test output value exceeds a predetermined threshold, to analyze the test output value to determine if the test output value is a legitimate system output or indicates an error in the system. If it is determined that the test output value is a legitimate value, re-training the ANN using a dataset containing the determined input and the test output value. Otherwise, if it is determined that the test output value is not a legitimate system output, then the system under test is analyzed to identify an error responsible creating the illegitimate system output and the identified error is corrected.

Identifying the output value from the output space of the software applications may be performed via an output generator configured to receive a current distribution and a target distribution and to output a new unexplored output vector y'. The output generator may be configured to apply restrictions to a contiguous region of the input space and apply restrictions to the output space to only select the new output vector from an unexplored output space.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
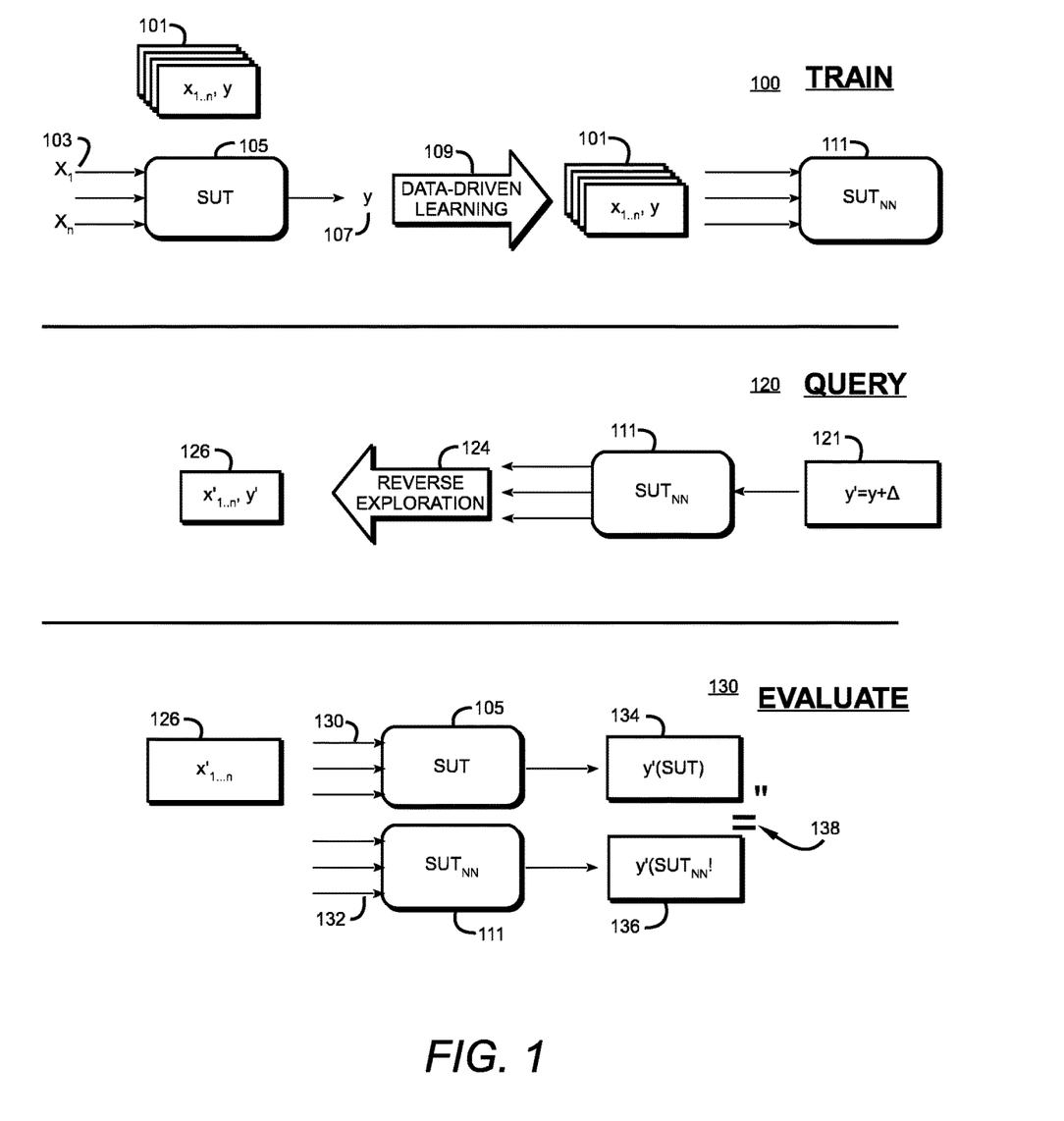
FIG. 1 is a block diagram of a system and method for creating test cases in a system under test according to aspects of certain embodiments of this disclosure.

FIG. 1 provides an overview of an approach according to an embodiment of this disclosure. The overall process may be distinguished by three main phases: Train 100, Query 120, and Evaluate 130.

In the first phase (Train) 100, A neural network $SUT_{NN}$ 111 is created that approximates the system under test (SUT) 105. The neural network 111 is trained 109 with datasets of input-output relations 101 (resp. x, and y) of the SUT 105. The datasets 101 are gained from existing or actual scenarios which have been verified to be correct. Based on the given datasets 101 available the training of the network 109 can also be scaled to a functional subset of interest of the entire SUT 105. The scenarios can be described by various sources such as test cases that are verified as correct or operational log files. The neural network $SUT_{NN}$ 111 learns the input-output relationships by feeding it the datasets 101. The training phase 100 is completed when the neural network 111 is able to approximate the existing data with a 'good' level of accuracy where 'good' is defined for each individual SUT 105 the method is applied to.

In the second phase (Query) 120, a novel output value y' 121 is introduced and used to exploit the neural network 111 in order to obtain an input x' 126, such that giving x' 126 to the $SUT_{NN}$ 111 yields y' 121. The definition of the new output y' 121 is derived as a modification of the existing output y by Δ resulting in y'=y+Δ. The y' 120 is chosen from non-covered or weakly covered output space by examining current output space coverage with existing inputs. This task may be performed manually, or the process may be automated by generating randomly selecting an uncovered output value or systematically selecting a value that is most distant to an existing covered output value. To receive x' 126 the neural network 111 is explored in reverse order 124, i.e., calculating the NN 111 backwards.

In the third phase (Eval) 130, the newly derived input value x' 126 from the new output y' 120 is presented to the SUT 105 to produce a test output y'(SUT) 134. The test output 134 is compared 138 to the predetermined output y'($SUT_{NN}$) 136 that is generated through the neural network $SUT_{NN}$ 111. If the two outputs y'(SUT) 134 and y'($SUT_{NN}$) 136 do not coincide, then an expert may be employed to inspect the cause of the unexpected outcome. This reduces the time required of experts by conventional methods as the expert may focus solely on mismatching results. Reasons the test output 134 and the predetermined output 120 may not equal one another may be explained by at least two possibilities. First, the unequal outputs may be correct (not due to a software error) but such a scenario has not yet been learned by the neural network 111. In this the training phase may be revisited to add the new scenario to the neural network 111. Second, the discrepancy may be attributable to a failure in the SUT (e.g., a software error in the control system of the SUT). In this case the failure can be analyzed, identified and corrected.

Otherwise, where the two outputs y'(SUT) and y'(SUT$_{NN}$) coincide, we have identified an input x' that is processed to the same result meaning that the newly explored output from where the test case was derived is functioning correctly. In this case we add the valid to our set of test cases and repeat the process at the Query phase defining another output y'.

Figure 2:
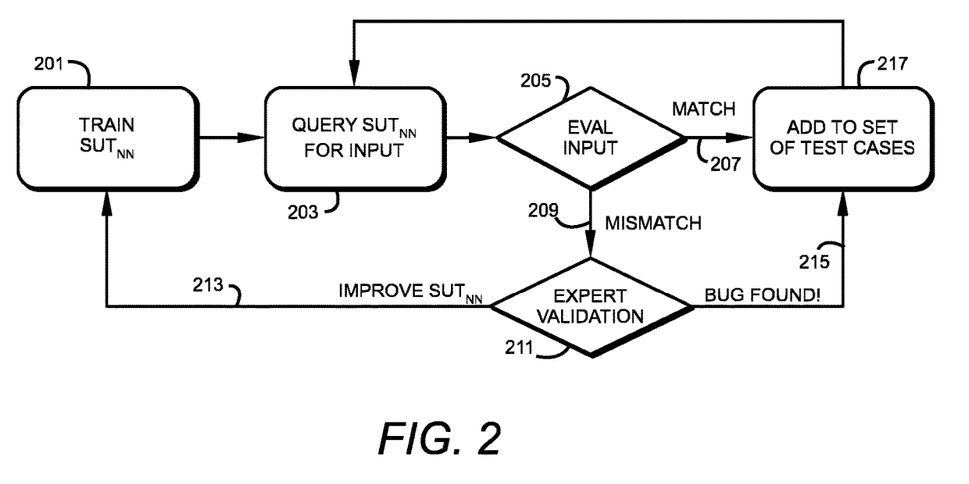
FIG. 2 is a flow diagram for creating and analyzing test cases for a system under test according to aspects of certain embodiment of this disclosure.

FIG. 2 depicts a method for generating test cases for software applications in a system under test according to certain embodiments of this disclosure. A neural network that provides a reference model to the physical system under test is trained 201 using data sets, including inputs and the resulting outputs that are embodied in data generated by the actual SUT. Based on a selected output value, the neural network is queried and evaluated in reverse order to identify input values that will result in the reference model neural network producing the selected output 203. The input values that are identified in step 203 are evaluated 205. Evaluation may include comparing the selected output that is produced by inputting the identified inputs to the neural network to outputs created by the physical SUT when the same inputs are provided to the SUT. If the outputs from the neural network match the outputs from the SUT 207, the test case is added to the collection of test cases for the SUT and increases the coverage of the output space for the SUT. If the outputs from the neural network and the SUT do not match 209, then an expert is utilized to analyze the discrepancy 211. If the result generated by the SUT is found to be valid, meaning the input/output dataset represents a valid scenario that had not previously been presented to the neural network during training, the training phase of the neural network is reentered to improve the reference mode 213. If it is determined that the discrepancy is instead due to an error within the system under test 215, then the error is located and corrected, and the correct input/output dataset is added to the set of test cases 217.

The above described systems and methods provide advantages over previous methods that required manual intervention to select test cases from the perspective of the input domain space. These conventional techniques rely on educated guesses rather than systematically concentrating on the output space. By beginning with the output space and targeting untested or under tested regions of the output space, the appropriate inputs may be identified without resorting to random attempts to produce the desired outputs or requiring massive amounts of data processing to process large numbers of input combinations. In this way, the test design for systems, particularly systems that include black-box testing such as legacy systems where the inner functionality of the system is not known may be automated. The ability to perform output space exploration increases coverage of unexplored test scenarios and discovers test cases based on the system output space. This in turn increases failure detection from the test cases derived. Furthermore, reduced test execution time is achieved because fewer test cases are needed due to the test cases being specifically selected to target specific portions of the output space.

The improved systems and methods of this disclosure provide technical features that improve the ability to test and verify software systems, such as software systems that provide control for industrial systems. For example, automated generation of input values for a given system output may be identified and tested. Systematically increasing coverage of the output space through the utilization of a trained Neural Network. Identifying pairs of output/input relationships that are of interest in testing the system, e.g., output values not covered by the existing test suite. Increased identification of input vectors which are likely to provoke system failures and automatic generation of the test oracle for the predicted test case. Using the disclosed systems and methods, higher quality products may be released due to higher testing coverage. Verification of products where source code is not available or only partially available (e.g. black boxes) or not fully understood (e.g., 3rd party products, legacy code).

Black box software testing is an increasing crucial part of quality assurance for industrial products. It becomes prevalent when the source code of the system under test is not available, which is often the case with legacy systems, third party software or when the system behavior is too complex to be represented by reusable design artifacts for testing. To verify reliable behavior of such software intensive systems, testing needs to ensure that the system produces correct outputs based on the various inputs defined by a corresponding input/output (In/Out) relationship. Even more critically, testing needs to be directed to find bugs. The probability to find bugs is highest in previously untested areas including unexpected corner cases. The better the coverage of the input/output domain, the higher the likelihood that the product will not contain errors.

Black-box testing helps to automatically generate test data without the knowledge of the SUT's internals. Traditionally, test data are generated either at random or through some form of systematic input space exploration. The input space exploration is either based on using a fault ontology or a divide and conquer strategy to guide the exploration. The nature of such input space exploration, however, makes both the probability as well as the timeframe for discovering relevant faults highly nondeterministic. This results in inefficient efforts to thoroughly test the system. Additionally, the coverage degree of the input space does not necessarily correlate to or indicate a similar coverage of the output space.

There are existing test techniques such as equivalence class testing or combinatorial test case generation which have been established within industry. While such techniques are moderately efficient at providing solutions to the coverage of combinatorial permutations over test input sets or configuration setups, these techniques struggle to cover all outputs of the system in relation to the test inputs. Other test generation or test suite reduction techniques may be based on the discovery of the input/output (In/Out) relationship of the system. These approaches are exclusively reliant on generating the expected results from the stimulated input data but fail to guarantee to find new input/output relationships and thus explore the output space domain sufficiently. Systematic test techniques also require considerable time and resources for test case generation and execution. Instead, random testing is an alternative approach frequently utilized, which is more feasible to run large number of test cases due to its simplicity and cost effectiveness. Empirical comparisons show that random testing and partition testing are equally effective. Adaptive Random Testing (ART) aims to randomly select test cases, but also to spread them evenly. The theory behind ART is that new test inputs that are located farther from the test inputs that reveal no failure are more likely to reveal failures. ART was proposed to improve the fault detection capability of random testing. ART exploits information on executed test cases, particularly successful test cases, to guide the random test input generation. Because failure causing inputs are often clustered together to form one or more contiguous regions, subsequent test inputs that are close (similar) to successful test cases are less likely to hit the failure-causing region than those that are far away. Hence, ART promotes diversity among random test cases.

This disclosure provides novel, intelligent test case generation methods that enjoy a higher probability of exposing system faults. This is achieved by systematically exploring the output space of the system under test. Adversarial examples are generated through back-propagation through an artificial neural network and generates effective test case generation by identifying input test values that correspond to untested regions of the output domain space. Selection of an appropriate output vector based on output space that is yet untested, as described in FIG. 1 at reference 121, may be performed automatically. The described solutions enhance the way in which the output space may be explored to find an unexplored output vector y'.

Figure 3:
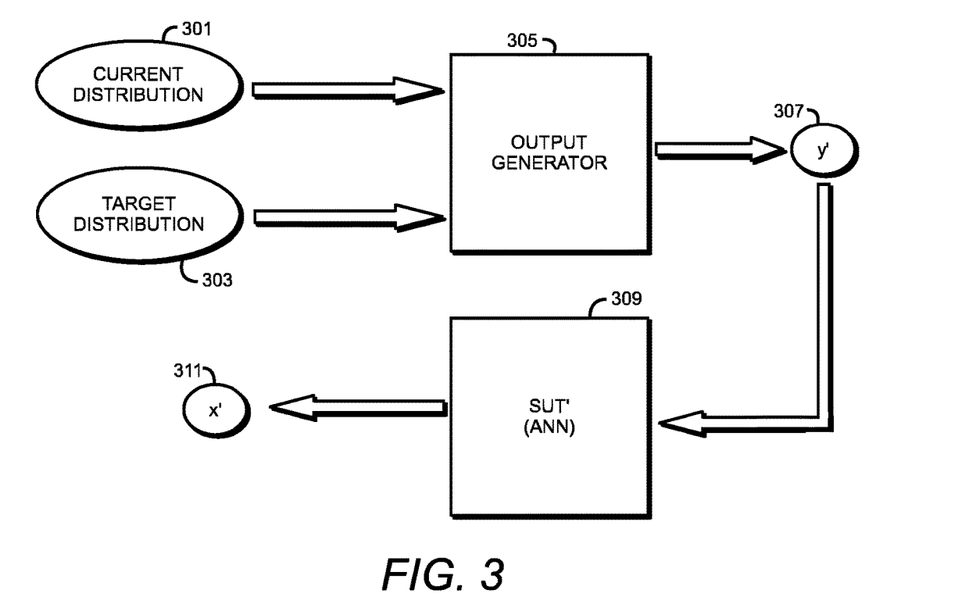
FIG. 3 is a flow diagram for exploring the output space of a system under test according to aspects of certain embodiments of this disclosure.

FIG. 3 is a flow diagram depicting embodiments of a method for selecting output vectors and subsequently identifying corresponding input vectors based on the output vector. Central to this process is output generator 305. The output generator 305 takes the current distribution of the output space 301 as input. The current distribution 301 can be easily determined on the basis of the existing test. This data provides the current coverage of the output space. To guide the output space exploration the output generator 305 additionally receives a target distribution 303 as input. The target distribution 303 represents the test goal in terms of output space coverage provided to the output generator 305. These inputs are used to determine how the output space is to be explored. The result is a new, unexplored output vector y' 307. The output vector y' 307 is then provided to the system under test represented by the artificial neural network ($SUT'_{(ANN)}$) 309. The output vector y' 307 is back-propagated through the neural network 309 and traced back to a set of corresponding inputs 311 that when forward processed through the neural network 309 will produce the output vector y' 307.

Output Generator 305 may operate in a number of ways. Two possible techniques will now be described.

Method 1: Enhanced Adaptive Random Output Generation

The definition of the new output y' 307 is derived as a modification of the existing output y by some delta Δ, resulting in y'=y+Δ. The search of Δ, which turns a covered output vector y into an uncovered output vector y' 307 is automated by an implemented output test generator 305. The test generator 305 is based on specified restrictions to the input as well as restrictions on the output space. The technique assumes that failing test cases are usually grouped into contiguous regions of the input space, but their output space reveals a disproportionate change. This is based on the theory of non-continuity functions where a slight change of the input results in a jump in the output. Accordingly, the random output generation is restricted to the uncovered output space and the contiguous region of an input vector.

Method 2: Rule-Based Output Generation

In rule-based output generation a new value y' 307 is defined by modifying an existing output from the training set by a context-dependent large value −δ. This method involves rules, which could be derived from either domain knowledge or traditional test techniques. A target output space distribution is determined by a domain expert and/or test engineer using classic test techniques including category-partition method, boundary-value analysis and domain-specific requirements.

Based on visual comparison of distribution plots of the current output space coverage obtained from the existing test data and the target output space distribution, gaps can be identified and new y' values 307 may be chosen from those gap areas. A visual comparison may be performed using graphical depictions that show categories of test cases and associating the number of test cases that fall into each category.

Figure 6A:
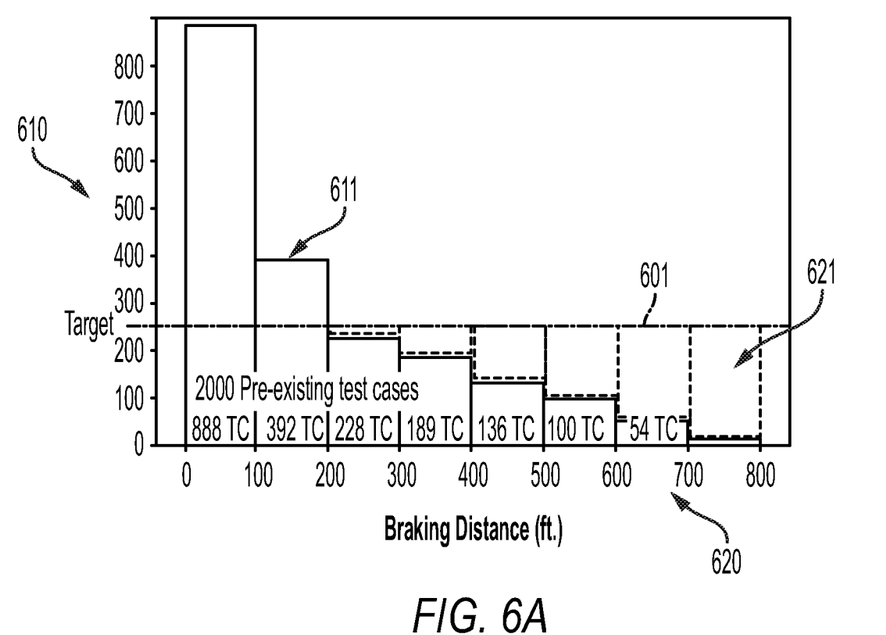
FIG. 6A and FIG. 6B are a graphical depiction for visual comparison of output space coverage according to aspects of certain embodiments of this disclosure.
Figure 6B:
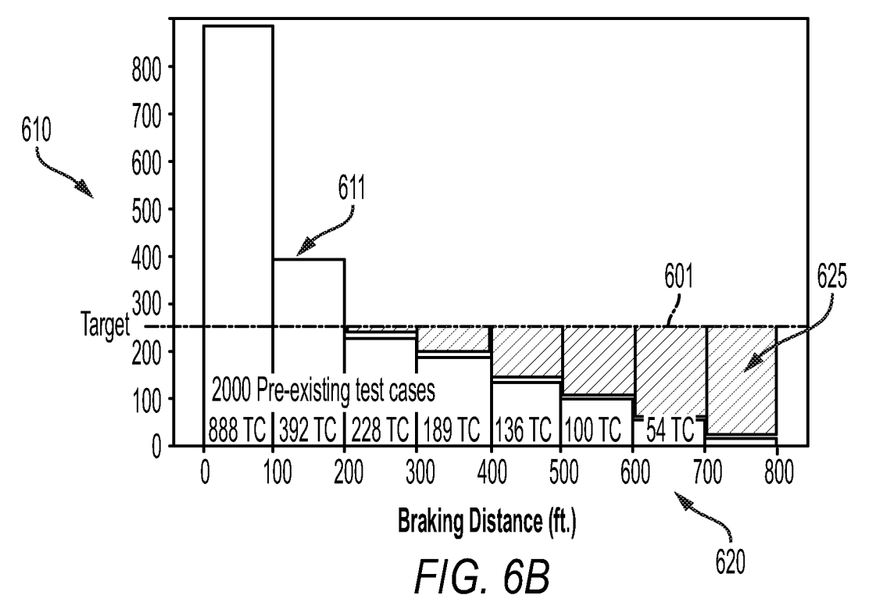

FIG. 6A and FIG. 6B provide an example of a graphical depiction for providing visual comparison of output space coverage according to some embodiments of this disclosure. FIG. 6A and FIG. 6B show a system under test which involves control systems for providing braking to a vehicle, for example a train. Braking distance is marked on the horizontal axis 620 while a number of test cases is represented on the vertical axis 610. The measured quality (braking distance 620) is separated into categories of possible outputs. That is, braking distance is broken down into 100 foot increments from zero to 100 feet up to 800 feet. For each category the number of test cases is represented by a series of bars arranged as histogram 611, For each category, a target number of test cases is established. In FIG. 6 the target number of test cases for each output category is 250 test cases 601. Given the starting point depicted in FIG. 6A, there are 2000 pre-existing test cases distributed across each output category as indicated. For example, for an output of a braking distance from zero to 100 feet, there are 888 test cases. For braking distance from 101 to 200 feet there are 392 test cases, 201 to 300 feet 228 test cases, 301 to 400 feet 189 test cases, 401 to 500 feet 136 test cases, 501 to 600, 100 test cases, 54 test cases from 601 to 700 feet and 16 test cases for braking distance over 701 feet. As may be viewed from FIG. 6A, braking distances greater than 200 feet are represented by less than the target number of test cases 601. This defines a region of under-testing output space 621. Using the techniques and process according to embodiments described in this disclosure, the under tested output space 621 can be purposefully target and test cases 625 can be generated to fulfill the deficit in test cases with respect to the target level 601. These test cases covering the output space 625 can be generated using the identified output space 621 and generating associated input values based on the untested output space using trained neural networks that are representative of the system under test.

These output selection techniques represent technical improvements providing systematic exploration of the output space by considering current and target distribution of the output data. They further provide guided output exploration by reducing the number of test input combinations and searching for only uncovered outputs in the output space. This result is other improvements including derivation of test inputs that will be efficient to provide better output space coverage. By improving the output space coverage, the likelihood of finding new defects is increased. Furthermore, testing is improved through enabling the identification of values where the relationship between changes to the input vector and resulting changes to the output space does not hold, (e.g., a small change in the input vector results in a disproportionate change of the output space). These techniques also allow for exploration of the input/output relationship to be performed before test cases have been produced. These technical improvements not only reduce the number of test cases rather but more importantly improve testing by identifying missing test cases.

Testing can be a resource and time intensive phase during product development. Reducing the number of test cases while maintaining the tests fault-detection capability preserves time and resources. The described methods decrease the effort required for testing by providing less yet efficient test cases to cover the output space more rigorously. In this manner, the described methods prevent duplicated test case generation and avoid test input generation for test cases that result in the same result. Overall, costs associated with testing are optimized by reducing the number of test cases evaluated.

Figure 4:
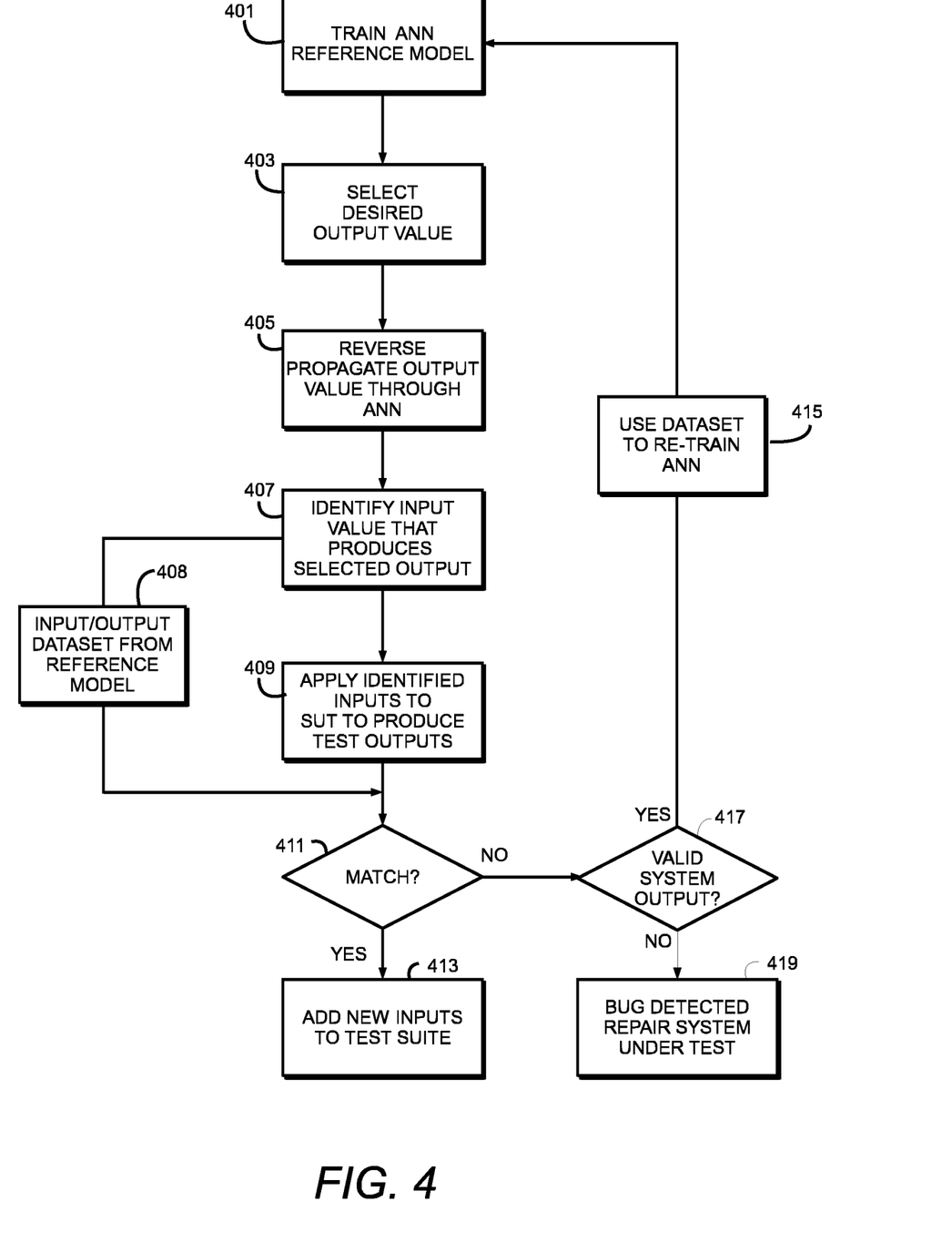
FIG. 4 is a process flow diagram for a method of creating and analyzing test cases of a system under test according to aspects of certain embodiment of this disclosure.

FIG. 4 is a block flow diagram of a method for automatically generating test cases for a system under test according to some embodiments of this disclosure. A reference model is created as an artificial neural network which is trained using data from the system under test 401. The training may be performed by providing the ANN with datasets comprising input data values and the associated output values that occur when the inputs are applied to the system under test. Based on the design of the system under test, the output space is analyzed to determine portions of the output space that remain untested or under-tested. A desired output value is selected that is representative of untested output space 403. The desired output value is then passed through the ANN in reverse to map the desired output value to the input values that result in the desired output according to the ANN 405. The input values associated with the desired output are identified 407 and the identified input values are provided to the system under test to generate test output values 409. The test output values and their associated inputs and the input/output datasets from the reference model 408 are then compared to determine if the output values according to the ANN model match the test output values generated by the system under test 411 based on the same input values. If the output values match, then the new inputs are added to the existing testing suite 413. Otherwise, if the output values do not match, it is determined if the outputs are valid outputs for the system under test 417. If the output values generated are valid 415, the data is used to retrain the ANN because it may be inferred that the input/output dataset represents valid data that the neural network was not exposed to during training. Otherwise, the outputs are determined to invalid system outputs 419 that represent a bug or error in the system being tested. Experts may be utilized to track down the erro and repair the system under test. 419.

Figure 5:
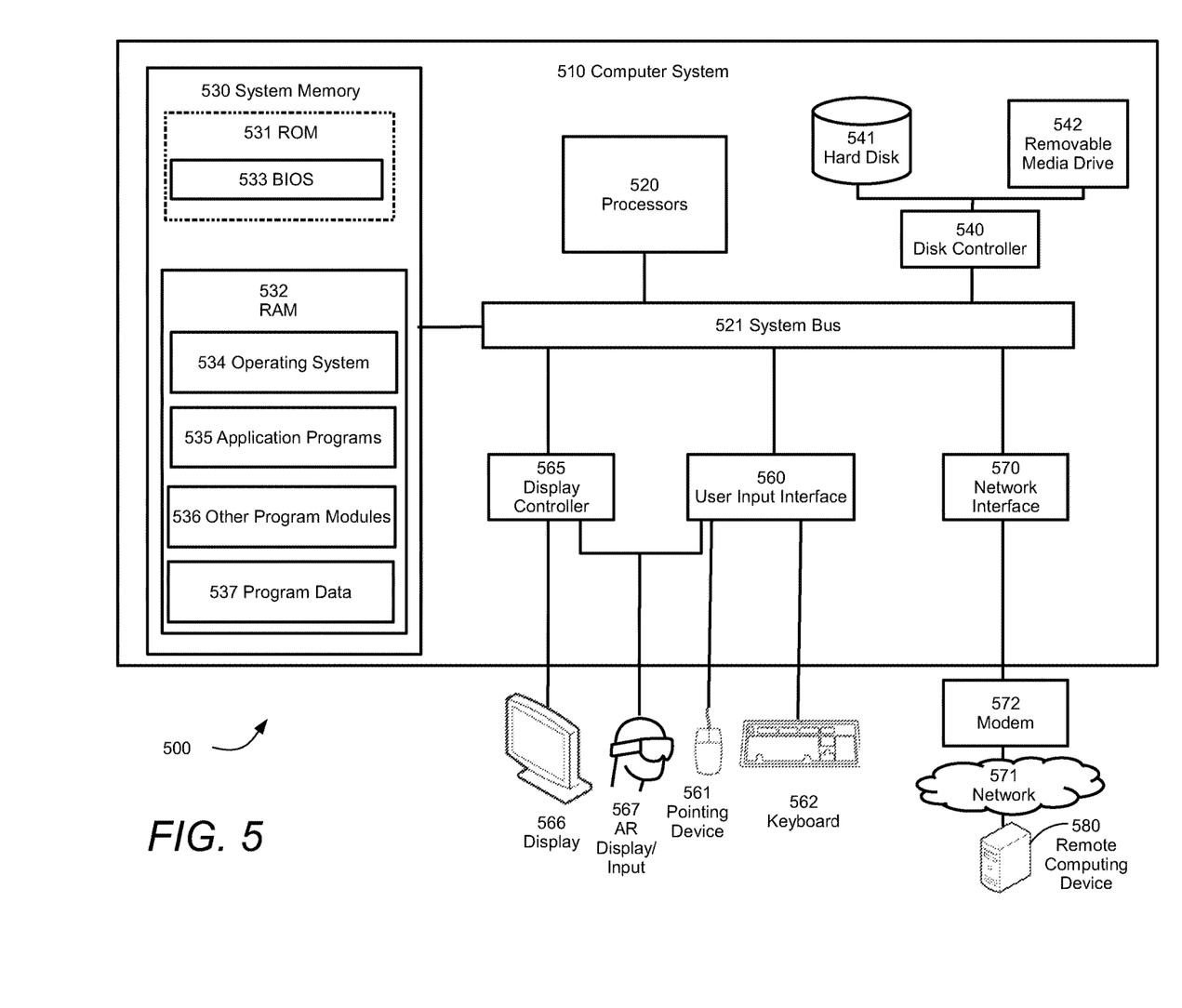
FIG. 5 is a block diagram of a computer system for implementing systems and methods for creating and analyzing test cases for a system under test according to aspects of certain embodiments of this disclosure.

FIG. 5 illustrates an exemplary computing environment 500 within which embodiments of the invention may be implemented. Computers and computing environments, such as computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, other program modules 536 and program data 537.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid state drive). Storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display or monitor 566, such as a cathode ray tube (CRT) or liquid crystal display (LCD), for displaying information to a computer user. The computer system includes an input interface 560 and one or more input devices, such as a keyboard 562 and a pointing device 561, for interacting with a computer user and providing information to the processors 520. The pointing device 561, for example, may be a mouse, a light pen, a trackball, or a pointing stick for communicating direction information and command selections to the processors 520 and for controlling cursor movement on the display 566. The display 566 may provide a touch screen interface which allows input to supplement or replace the communication of direction information and command selections by the pointing device 561. In some embodiments, an augmented reality device 567 that is wearable by a user, may provide input/output functionality allowing a user to interact with both a physical and virtual world. The augmented reality device 567 is in communication with the display controller 565 and the user input interface 560 allowing a user to interact with virtual items generated in the augmented reality device 567 by the display controller 565. The user may also provide gestures that are detected by the augmented reality device 567 and transmitted to the user input interface 560 as input signals.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium, such as a magnetic hard disk 541 or a removable media drive 542. The magnetic hard disk 541 may contain one or more datastores and data files used by embodiments of the present invention. Datastore contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

The computing environment 500 may further include the computer system 510 operating in a networked environment using logical connections to one or more remote computers, such as remote computing device 580. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A method for testing software applications in a system under test (SUT) comprising:
   building a reference model of the SUT, the reference model comprising a computer-based neural network;
   training the reference model using input data and corresponding output data generated by the SUT;
   based on the output data, identifying unexplored output space defined by respective outputs not represented in the output data used to train the reference model;
   selecting an output value within the unexplored output space and within a domain of possible output values of the SUT to define a selected output value;
   applying the selected output value to the reference model and tracing the selected output value through the reference model to identify test input value that when input to the reference model, produce the selected output value; and
   using the identified test input value to test the SUT to generate a test output value from the SUT;
   providing the identified input value to the reference model to generate the selected output value;
   comparing the selected output value from the reference model to the test output value from the SUT; and
   if the comparison indicates a difference between the selected output value from the reference model and the test output value from the SUT exceeds a predetermined threshold, analyzing the test output value to determine if the test output value is a legitimate system output or if the difference indicates an error in the SUT.

2. The method of claim 1, wherein if it is determined that the test output value is a legitimate value, re-training the neural network using a dataset containing the identified input value and the test output value.

3. The method of claim 1, wherein if it is determined that the test output value is not the legitimate system output, then the system under test is analyzed to identify an error responsible for creating an illegitimate system output and the identified error is corrected.

4. The method of claim 1, wherein selecting the output value from the unexplored output space of the software applications comprises:
   an output generator receiving a current distribution and a target distribution; and
   outputting a new unexplored output vector y'.

5. The method of claim 4, further comprising:
   applying restrictions, by the output generator, to a contiguous region of input space; and
   applying the restrictions, by the output generator, to output space of the software applications to only select a new output vector from the unexplored output space.

6. The method of claim 4, further comprising:
   selecting, by the output generator, the new unexplored output vector y' by modifying an existing output from a training set by a context-dependent large value and based on a visual comparison of distribution plots of a current output space coverage and a target output space distribution.

7. A system for testing software applications in a system under test (SUT) comprising:
   a computer processor in communication with the SUT;
   a memory in communication with the computer processor containing executable instructions that, when executed by the processor, cause the processor to:
   create a data structure representative of a reference model that approximates a function of the SUT, wherein the reference model is embodied as an artificial neural network (ANN);
   identify unexplored output space defined by respective outputs not observed in prior testing of the reference model;
   identify an output value from the unexplored output space of the software applications to define an identified output value;
   present the identified output value to the reference model;
   trace the identified output value through the reference model to determine at least one input value that results in the identified output value when input to the reference model;
   provide the determined input value to the reference model to generate the identified output value;
   provide the determined input value to the SUT to generate a test output value from the SUT;
   compare the identified output value to the test output value; and
   if the comparison indicates a difference between the identified output value and the test output value exceeds a predetermined threshold, analyze the test output value to determine if the test output value is a legitimate system output or if the difference indicates an error in the system under test.

8. The system of claim 7, wherein if it is determined that the test output value is a legitimate value, re-train the ANN using a dataset containing the determined input value and the test output value.

9. The system of claim 7, wherein if it is determined that the test output value is not the legitimate system output, then the system under test is analyzed to identify an error responsible for creating illegitimate system output and the identified error is corrected.

10. The system of claim 7, wherein identifying the output value from the unexplored output space of the software applications comprises:
    an output generator configured to receive a current distribution and a target distribution and to output a new unexplored output vector y'.

11. The system of claim 10, wherein the output generator is configured to:
    apply restrictions to a contiguous region of input space; and
    apply the restrictions to output space of the software applications to only select a new output vector from the unexplored output space.

12. The system of claim 10, wherein the output generator is configured to:
    select the new unexplored output vector y' by modifying an existing output from a training set by a context-dependent large value and based on a visual comparison of distribution plots of a current output space coverage and a target output space distribution.

* * * * *